United States Patent [19]

Vowles et al.

[11] 4,086,439
[45] Apr. 25, 1978

[54] CLASS OF LINE IDENTIFIER APPARATUS AND METHOD THEREFOR

[76] Inventors: Sandra Rae Vowles, 1300 Utica, Denver, Colo. 80204; Michael Alan Jacobs, 1090 S. Parker Rd., Denver, Colo. 80231; Amos Ray Jackson, 2887 McClelland St., Salt Lake City, Utah 84106

[21] Appl. No.: 751,490

[22] Filed: Dec. 17, 1976

[51] Int. Cl.² ............................................ H04M 5/18
[52] U.S. Cl. ............................................. 179/27 DA
[58] Field of Search ....... 179/27 DA, 18 FH, 18 DA, 179/6.3 R

*Primary Examiner*—William C. Cooper
*Attorney, Agent, or Firm*—Burton & Dorr

[57] ABSTRACT

An apparatus identifying a class of called telephone lines by extending an identity signal back over the called line to a calling central operator or control. The identifier apparatus includes a signal identity generator connected to the called line, a signal decoder located at a calling central control such as an operator cordboard or traffic service position (TSPS), and a time-out for deactivating the generator after a predetermined time period has elapsed. A method is also set forth where a uniquely coded signal is extended over the communication line to an operator when an "OFF HOOK" condition appears from the called line to warn the operator that the called line is not authorized to receive collect calls.

16 Claims, 5 Drawing Figures

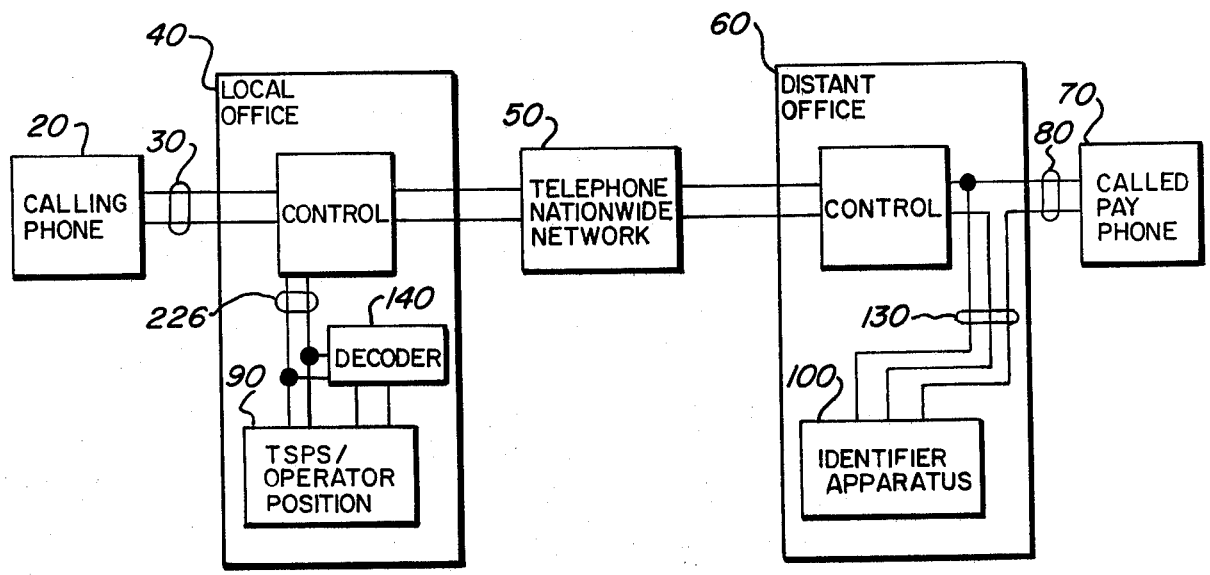
Fig_1
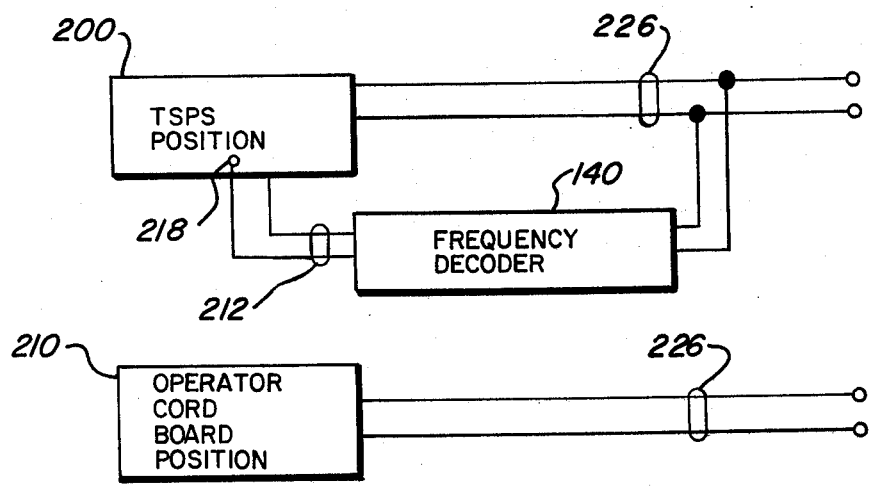
Fig_2

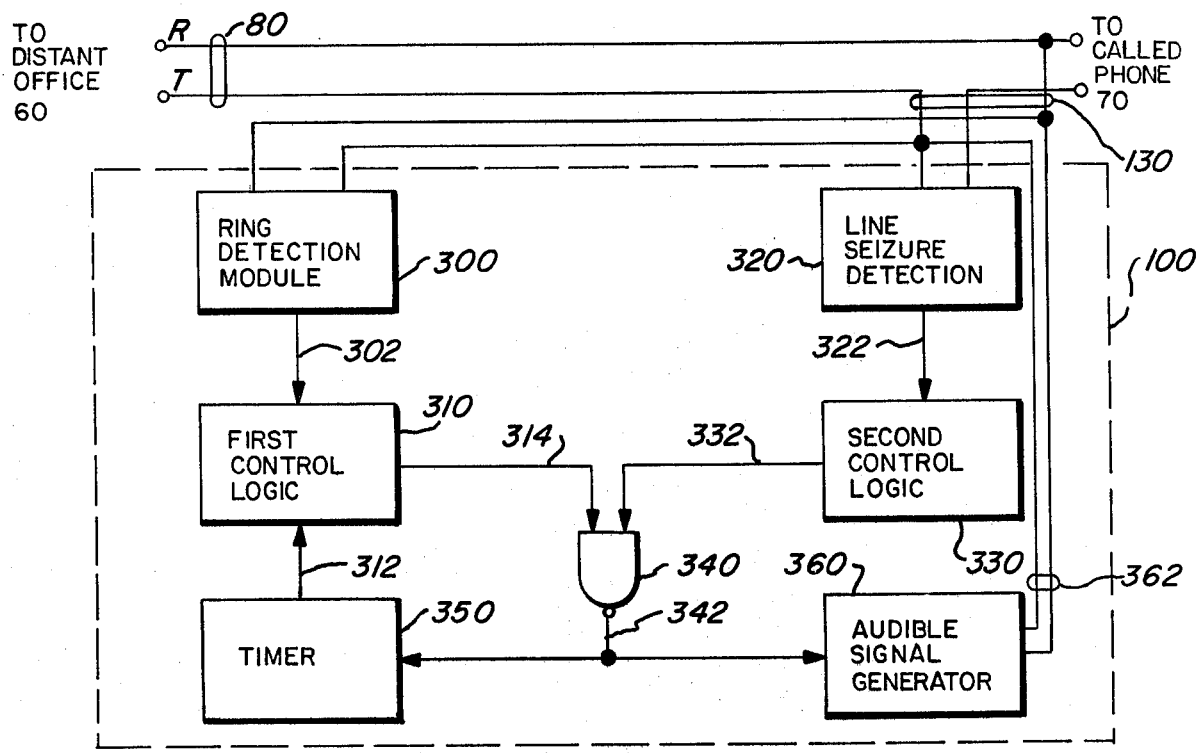
Fig_3
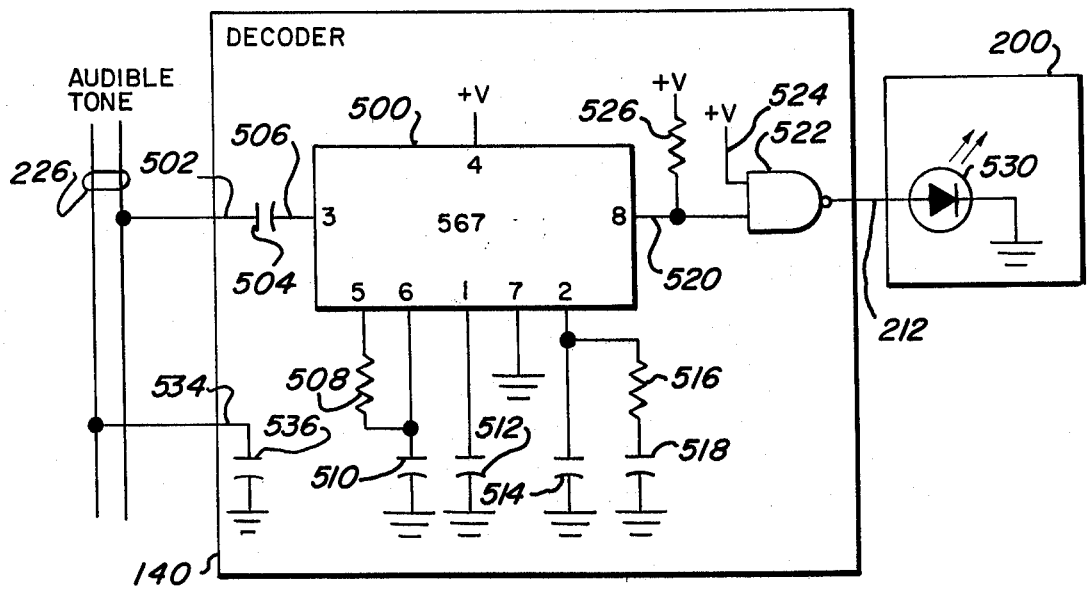
Fig_5

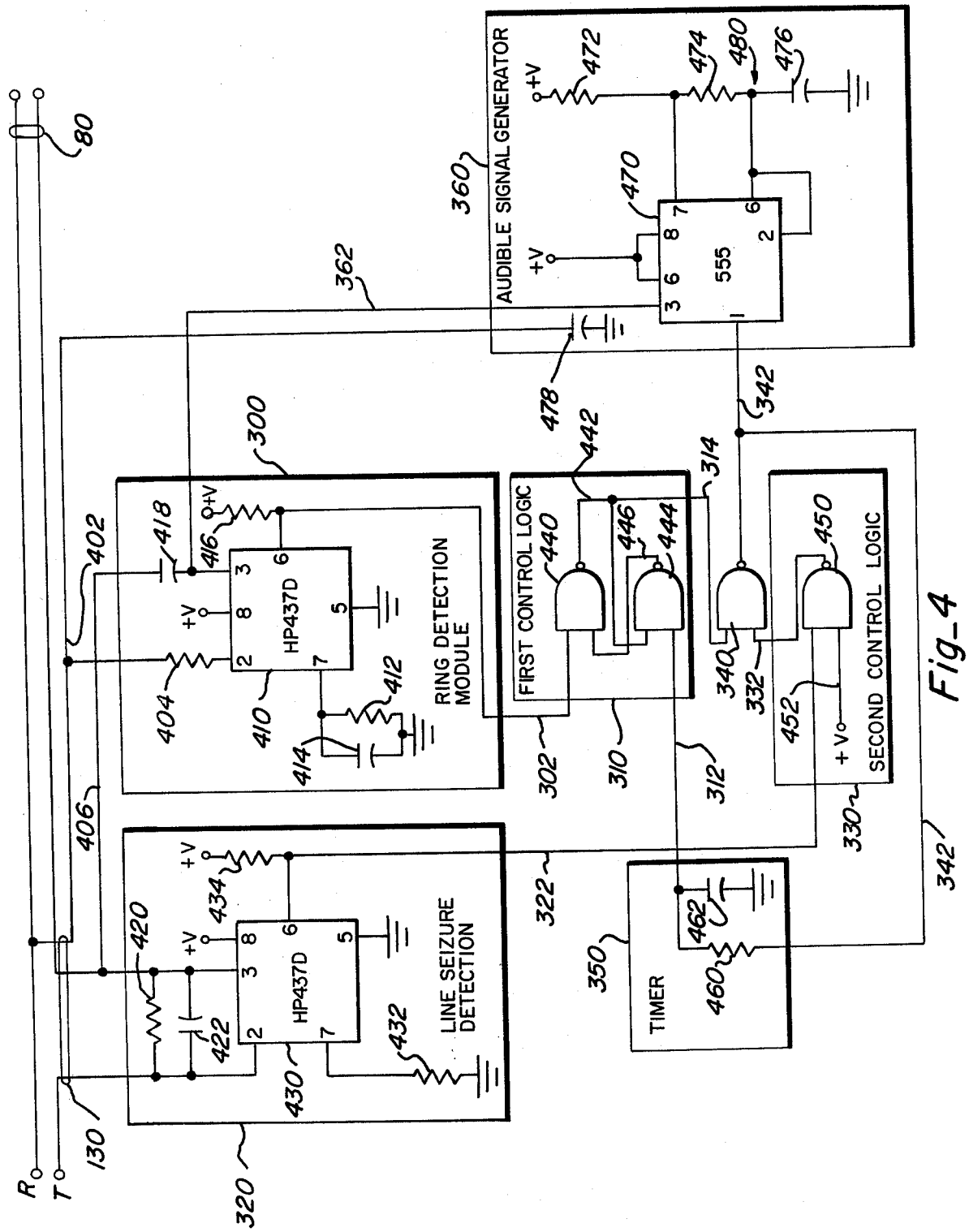
Fig_4

CLASS OF LINE IDENTIFIER APPARATUS AND METHOD THEREFOR

BACKGROUND OF THE INVENTION

1. Field of the Invention

The present invention relates generally to class of line identifiers and more particularly to coin or pay telephone line identifying circuits.

2. Description of the Prior Art

The purpose of the following invention is to provide a positive means for identifying a coin or a pay telephone wherever it is located, in whatever number group, throughout the telephone system.

Traditionally, coin or pay telephones have been assigned telephone numbers in the 9000 series connector number group with an appropriate prefix and area code. The operator handling a collect telephone call to such an assigned pay telephone number realizes, by the above group assignment, that such a telephone is a pay telephone and that collect calls cannot be connected to it.

Unfortunately, in smaller telephone exchanges and in larger metropolitan areas, with multiple telephone exchanges, many coin or pay telephones are assigned to numbers outside the traditional 9000 series connectors. In large metropolitan areas, increased coin telephone installations have, in some cases, used up the traditionally assigned pay-station number category. In small rural areas, such calling groups simply may not be available. In either case, an operator, (TSPS) or other, at the calling location cannot tell if the number called, which may be 2000 miles away, is a coin telephone. Indeed, in some areas, lack of sufficient central office connector lines has caused business or residential telephones to actually be assigned a number in the 9000 number group traditionally reserved for coin numbers.

Whatever the reason for the unidentified assignment, collect calls are being made to pay telephones by users having fraudulant intent. This results in a subsequent loss of revenue to the telephone company; this loss must be passed on to the general rate-paying subscribers. There is currently no available electronic circuit for positively identifying a called pay telephone line that may have a number assignment which is outside the traditional number group.

The problem is simple. In the case of a collect call to a pay telephone not in the traditional number group, the charges are uncollectable unless the operator is made aware that the called number serves a line connected to a pay telephone. Currently, the operator is not able to know whether the called telephone is a pay telephone and, thus, numerous collect long distance calls are made without being properly billed. This is especially true when a collect long distance call is made from one pay telephone to another by persons, agreeing in advance, to call at a specific time.

Another more recent problem relates to telephones in school dormitories or similar locations where no single party is responsible for long distance toll charges. Present procedures can control out-going calls and route them through an operator, but there is essentially no control on in-coming collect calls.

The inventors are aware of the following prior art:

| Inventor | Pat. No. | Date |
|---|---|---|
| Conway | 1,700,469 | Jan. 29, 1929 |
| Collis et al | 2,299,212 | Oct. 20, 1942 |
| Wicks | 2,544,944 | Mar. 13, 1951 |
| Grimes | 2,546,067 | Mar. 30, 1951 |
| West et al | 2,557,487 | June 19, 1951 |
| Balzer et al | 2,569,650 | Oct. 2, 1951 |
| Smith | 3,169,170 | Feb. 9, 1965 |
| Blashfield | 3,201,523 | Aug. 17, 1965 |
| Johansen et al | 3,534,174 | Oct. 13, 1970 |
| Knox | 3,553,382 | Jan. 5, 1971 |
| Regniere | 3,651,275 | Mar. 21, 1972 |
| Lee, Jr. et al | 3,671,677 | June 20, 1972 |
| Mogtader | 3,920,936 | Nov. 18, 1975 |

None of the above prior art patents suggest or disclose an approach for identifying a called telephone line. The 1951 patent to West teaches the use of a separate reply signal circuit for providing a signal from the receiving or called end to the sending or calling end in the event that the called telephone does not answer. The patents to Mogtader, Lee, Jr. et al., Regniere, Blashfield, and Wicks teach the use of various circuit configurations by which calls to unauthorized called numbers are detected and diverted to an operator for an intercept or for denying service thereto. In all cases, the detection of the unauthorized called number is detected at a location near the calling number.

OBJECTS OF THE INVENTION

It is an object of the present invention to provide a novel called line identifier.

It is another object of the present invention to provide a novel pay telephone line identifier.

It is another object of the present invention to provide in a telephone system having at least a called line, a calling line, means responsive to an origination on said calling line for interconnecting said called line to the calling line, wherein the origination is a request for a collect call from the calling line to the called line, and means cooperative with the interconnecting means for delivering any collect call information to an operator wherein an improvement to the system comprises a circuit responsive to the interconnection of the calling line to the called line for extending a unique signal to the delivering means when the called line is not authorized to receive a collect call and a circuit in said delivering means responsive to the uniquely extended signal for indicating to the operator the unauthorized status of the called line.

It is still another object of the present invention to provide in a telephone system having at least a pay telephone, a calling line, means responsive to an origination from the calling line for interconnection to the pay telephone, and means cooperative with the interconnecting means for interrogating the called party answering the pay telephone when the origination is a collect call, an improvement to the telephone system comprising means responsive to the interconnection of the pay telephone to the calling line for extending a unique signal to the interrogating means and means in the interrogating means responsive to the signal for indicating to an operator that said called pay telephone is not authorized to receive a collect call.

It is still another object of the present invention to provide a novel method for identifying to an operator in a telephone system a collect call to a called line which is not authorized to receive a collect call wherein said system has at least a calling line, a called line which is not authorized to receive collect calls, means responsive to an origination on the calling line requesting a collect call to the called line for interconnecting the called line to the calling line, and means cooperative with the interconnecting means for delivering any collect call information to the operator, the new and novel method including the steps of extending a uniquely coded signal over the called line to the delivery means responsive to the interconnection and indicating to the operator the non-collect status of the called line in response to the extended signal.

It is still another object of the present invention to provide a novel device connected to the telephone line of a telephone which is not authorized to receive collect calls for identifying said telephone wherein the device comprises a circuit connected to the line for detecting a call to the line and a circuit responsive to the detection for applying a uniquely coded signal to the line.

SUMMARY OF THE INVENTION

The present invention comprises a call identifying circuit located on the called line of a pay telephone, or of any other station to which collect calls are not authorized, which generates a uniquely coded signal whenever a call is directed to the pay telephone or other so restricted telephone. At an initiating operator position which is usually located in the calling local office, the operator at that position is receptive of the uniquely coded signal and prevents the completion of a collect call to that pay telephone since pay telephones and certain other telephones are not authorized to receive collect calls.

The pay telephone line identifier circuit located on the called line includes circuitry for detecting the presence of a call to the pay telephone and a signal generating circuitry for extending over the called line a uniquely coded signal. Furthermore, a time-out circuit is provided to extend the uniquely coded signal from the called line for a predetermined time interval.

At the local calling office, circuitry is provided for decoding the uniquely coded signal from the called line and providing an indication to the operator interconnecting the collect call.

The new and novel method disclosed in the following specification teaches the steps of detecting a call directed to a called phone line, extending a uniquely coded signal over the called line in response to the detection, and decoding that uniquely coded signal at the distant operator position. Furthermore, the operator may transfer the call to an operator at the called phone's location so that the operator there may collect for the call in advance of communication.

DRAWINGS

FIG. 1 is a functional diagram showing the interconnection of the calling phone with the called phone in a conventional telephone network.

FIG. 2 illustrates two embodiments of an operator position.

FIG. 3 is a functional block diagram presentation of the various components of the identifier apparatus of the present invention.

FIG. 4 is an electronic schematic of the line identifier apparatus of the present invention as shown in FIG. 3.

FIG. 5 is a schematic diagram of a decoder for use in the operator position as shown in FIG. 2.

In FIG. 1 are depicted the elements of a conventional telephone system 10 including the provision of a calling phone 20, the corresponding calling line 30, a local office 40 receptive of the calling line 30 from the calling phone 20, interconnection of the local office with the telephone nationwide network 50, the interconnection of the telephone network 50 with a distant office 60, and the interconnection with the distant office 60 to a called pay phone 70 over a called pay phone line 80. Such elements of the telephone system 10 are conventional and are currently manufactured by a plurality of different telephone companies. For example, if the calling phone 20 desires to place a collect telephone call to the called pay telephone 70, the following occurs. The originating request is delivered over the calling line 30 from the calling telephone 20 to a local office 40. An operator 90 in the local office 40 responds to the collect call request from calling phone 20 by extending the dialed number into the telephone nationwide network. The telephone network 50 in turn connects to the desired distant office 60 which in turn rings the called pay phone 70. When the called phone goes Off-Hook, the voice path connection between the operator and the called party is complete. At this time the operator interrogates the called party as to whether or not the called party will accept charges. If the answer is in the affirmative, then the operator disconnects from the voice path and the calling party talks with the called party. In conventional approaches, however, the operator at position 90 often does not know whether or not the called phone 70 is a pay or coin telephone or any other telephone that is restricted from receiving collect calls. Pay or coin telephones typically are not authorized to receive collect calls. To avoid this problem, the apparatus of the present invention 100 interconnects with the called line 80 as follows.

In the preferred embodiment, shown functionally in FIG. 1, the identifier apparatus is interconnected to the called pay phone line 80 in the distant office 60 over interconnecting line 130. For each called pay telephone 70, an identifier apparatus 100 may be connected to called line 80 of the called phone 70. Thus, as the called pay telephone 70 is ringing, the TSPS operator 90, as mentioned, is in communication with the called pay phone 70. When the customer answers the ring and the telephone goes Off-Hook, the identifier apparatus 100 generates a uniquely coded signal over lead 130 into the established communication path to access a decoder 140. The decoder 140 detects the presence of the signal in the path and appropriately indicates to the operator at position 90 that the called phone for the collect call is a pay phone or other telephone that is not authorized to receive collect calls. At this time, the operator at position 90 can inform the party of the calling phone 20 that a collect call cannot be made to a pay telephone or the operator at position 90 may interconnect the calling party 20 with an operator in switching office 60 for collection of the call in advance.

The two different types of operator positions 90 are shown in FIG. 2 to include a TSPS position 200 and an operator cordboard position 210. The signal carrying line 226 is indicated in each case. In the event the operator position 90 is that of a TSPS position 200, the frequency decoder circuit 140 is receptive of the generated signal on the return line 226 and becomes activated to issue an indication signal on lead 212 to the TSPS operator. This indication signal may appropriately drive any conventional alerting device including an alarm or visual display 218. If the operator cordboard position 210 is used, the coded signal appearing on lead 226 directly goes into the earphones of the operator.

A diagrammatic view of the preferred embodiment of the present invention is shown in FIG. 3 to include the identifier apparatus 100 located on the called line 80 between the called pay station 70 and the switching control in the distant office 60. This embodiment operates in the following manner. At the sequential occurrence of the events of the ring to the called pay station 70 and the ensuing Off-Hook indication therefrom, the identifier apparatus 100 extends a uniqely coded signal over two of the leads 130 to network 50 and thence to line 226. This uniquely coded signal on two of the leads 130 operates to signal either a TSPS position 200 or an operator cordboard position 210.

As shown in FIG. 3, a ring detection module 300 is bridged across the called line for generating an output whenever the called phone 70 is rung. The ring detection module 300 is interconnected with a first control logic 310 over lead 302 and the first control logic 310 is further interconnected over lead 312 with a timer 350. The output of the first control logic 310 is interconnected over lead 314 with a NAND gate 340. The line seizure circuit 320 is responsive to current in the called line for generating an output over lead 322 whenever the called line goes Off-Hook. The line seizure circuit 320 is interconnected over lead 322 with the second control logic 330 whose output is connected over lead 332 to the remaining input of NAND gate 340. The output of the NAND gate 340 is fed back over lead 342 to the timer 350 and further accesses the audible signal generator 360. The output of the audible signal generator 360 is delivered over lead 362 to the called line.

In operation, the ring detection module 300 generates a low output on lead 302 whenever the called pay station 70 is being rung. When the called pay station 70 goes Off-Hook, the line seizure detection circuit 320 also generates a low signal on lead 322. The first control logic 310 responds to the low signal on lead 302 to generate a high signal on lead 314. The second control logic 330 responds to the low signal on lead 322 to likewise generate a high signal on lead 332. The combination of the two high signals on leads 314 and 332 cause the output of the NAND gate 340 on lead 342 to go low. The low signal on lead 342 activates both the timer 350 and the audible signal generator 360. The audible signal generator 360 generates a uniquely coded tone appearing on lead 362 back onto the called line. The timer 350 is also activated by the low signal on lead 342 and is fed back into the first control logic 310 over lead 312. After a predetermined time interval as determined by pre-existing conditions in the timer 350, the first control logic effectuates a low signal on lead 314 thereby causing the output of the NAND gate 340 to go high on leads 342 thereby deactivating the audible signal generator 360 and causing the uniquely coded signal on lead 362 to cease. It should be noted that the feedback timer circuit 350 may be optional without departing from the spirit of this invention.

The details of the preferred embodiment shown in FIG. 3 are shown in FIG. 4 to include the following. The ring detection module 300 is connected from the ring side of the called line 80 over lead 402 through resistor 404 to pin 2 of an integrated circuit chip 410. The integrated circuit chip 410 is preferably that conventionally known as HP437D. Pin 8 of integrated circuit chip 410 is biased to positive voltage while pin 5 is grounded. Pin 7 is connected through an RC parallel network having resistor 412 and capacitor 414 connected in parallel to pin 7 of the other ends of which are grounded. Pin 6 of integrated circuit chip 410 is connected through resistor 416 to positive voltage and is further connected to lead 302 which accesses the first control logic circuit 310. Pin 3 of integrated circuit chip 410 is connected through capacitor 418 to the tip side T of the called line over lead 406. The preferable component values for the ring detector module 300 are as follows:

Resistor 404 — 22 K ohms
Resistor 412 — 150 K ohms
Capacitor 414 — 5 mF
Resistor 416 — 10 K ohms
Capacitor 418 — 0.25 mF The line seizure detection circuit 320 comprises the following elements. A resistor 420 is inserted in the tip line T of the called line 80 and is in parallel with capacitor 422. One end of the parallel resistor 420-capacitor 422 combination is connected to pin 2 of integrated circuit chip 430 which is conventionally available as a Model No. HP437D. The other end of the parallel resistor 420 - capacitor 422 combination is connected to pin 3 of integrated circuit chip 430. Pin 8 of the chip 430 is biased to positive voltage while pin 5 is grounded. Pin 6 is connected through resistor 434 to positive voltage and is further connected to lead 322 which accesses the second control logic circuit 330. Pin 7 is connected through resistor 432 to ground. The preferred components for the line seizure detection circuit 320 are:

Resistor 420 — 68 ohms
Capacitor 422 — 3 mF
Resistor 432 — 18 M ohms
Resistor 434 — 10 K ohms The first control logic circuit receives an input over lead 302 from the ring detection module 300 which specifically accesses NAND gate 440. The output of NAND gate 440 is delivered over lead 442 to input a second NAND gate 444. The output of NAND gate 444 is fed back to the second input of NAND gate 440 over lead 446 so that the two NAND gates 440 and 444 form a RS flip-flop arrangement. The second input to NAND gate 444 is delivered over lead 312 from the timer circuit 350.

The second control logic 330 receives an input from the line seizure detection circuit 320 over lead 322 which specifically accesses NAND gate 450, the other input of which is biased to positive voltage over lead 452. The output of NAND gate 450 is delivered over lead 332 to input NAND gate 340.

The timer circuit 350 receives an input 342 from the output of NAND gate 340 which directly accesses resistor 460, the other end of which is connected to one end of capacitor 462. The other end of capacitor 462 is grounded. The juncture of resistor 460 and capacitor 462 is connected to lead 312 which accesses the second input of NAND gate 444 in the first control logic circuit 310. The preferable values for resistor 460 and capacitor 462 are:

Resistor 460 — 1.5 K ohms
Capacitor 462 — 470 mF

The remaining circuitry concerns the audible signal generator 360 which receives an input from lead 342 from NAND gate 340 which accesses pin 1 of the integrated circuit conventionally known as RS555. Pins 6 and 8 of the integrated circuit chip 470 are biased to positive voltage. Pin 7 is connected through resistor 472 to positive voltage and is further connected through resistor 474 to a capacitor 476, the other end of which is grounded. Pins 2 and 6 of the integrated circuit chip 470 are connected to a node 480 which is interconnected between resistor 474 and capacitor 476. The output of the integrated circuit chip 470 is connected to pin 3 over lead 362 which is interconnected through capacitor 418 to the tip side T of the called line 80 over lead 406. To complete the audio circuit across called line 80, the ring side R is connected over lead 402 through capacitor 478 to the common ground. The preferable values for the audible signal generator are:

Resistor 472 — 4.7 K ohms
Resistor 474 — 220 K ohms
Capacitor 476 — 0.001 mF
Capacitor 478 — 0.01 mF The preferred embodiment 100 shown in FIGS. 3 and 4 operates as follows. When a ringing voltage appears on the called line, the output of integrated circuit chip 410, conventionally, generates a low signal on lead 302 assuming that the signal appearing on lead 446 is high, the appearance on the low signal on lead 302 causes the output of NAND gate 440 to go high. The high signal now appears as an input to NAND gate 340. Likewise, upon the detection of an Off-Hook condition, in which current is flowing in the tip side T of called line 80, a voltage is developed across resistor 420 and that voltage causes the output of integrated circuit chip 430 at pin 6 to go low. The low signal is delivered to one input of NAND gate 450 causing its output to go high. At this time, the output of the NAND gate 340 goes low which activates the integrated circuit 470 to generate a tone on lead 362. The tone is a square wave signal on any desirable frequency as determined by resistors 474, and 472, and capacitor 476. The low output of gate 340 is also delivered back into the timer 350 which, after a predetermined time delay as determined by resistor 460 and capacitor 462, causes the value on lead 312 to go low.

Therefore, prior to any action on the called line, the output of NAND gate 340 is high. The high condition causes the capacitor 462 to charge up to a positive value. The input 312 to NAND gate 444 is high and input 302 to NAND gate 440 is high. At this time, the state of the flip-flop of NAND gate 440 and 444 provides a low on lead 314 while lead 446 is high. At the event of ringing, a low is delivered on lead 302 which causes the output of gate 440 to go high. The combination of two high signals at the input of NAND gate 444 causes the output of NAND gate 440. At this time, ringing can go away but a high signal will be maintained at the input to gate 340 over lead 314. When the called line goes Off-Hook, a low signal is generated on lead 322 which is inverted by gate 450 to a high signal appearing on the remaining input to NAND gate 340. The combination of the two high signals on NAND gate 340 causes lead 342 to go low which essentially grounds capacitor 462 in the timer circuit 350, which after a predetermined time causes the input to NAND gate 444 to go low. Such action forces the output of NAND gate 444 to go high, the combination now of the two high signals at the input of NAND gate 440 causes the output to go low, thereby causing the output of NAND gate 340 to go high which deactivates the audible signal generator 360.

The detailed electronic circuitry for the decoder 140 is shown in FIG. 5 to include a conventional 567 decoder chip 500 interconnected as shown. Pin 3 is in receipt of the audible tone appearing on line 226 over lead 502 through an isolation capacitor 504 and over lead 506 into pin 3 of chip 500. The other side of line 226 is connected to the common ground over lead 534 through capacitor 536 to ground. Pin 4 of chip 500 is biased to positive voltage. Pin 5 is interconnected through resistor 508 to pin 6 and pin 6 is further connected through capacitor 510 to ground. Pin 1 of chip 500 is connected through capacitor 512 to ground. Pin 7 is grounded. Pin 2 is connected through capacitor 514 to ground and is further connected through resistor 516 and capacitor 518 to ground. The output of chip 500 is delivered at pin 8 over lead 520 to one input of a NAND gate 522, the other input of which is connected over lead 524 to positive voltage. Lead 520 is further interconnected through resistor 526 to positive voltage. The output of NAND gate 522 is delivered over lead 212 to drive a LED (Light Emitting Diode) 530 located in the TSPS position 200. In operation, whenever the generated tone of the present invention appears on line 226, the output of gate 522 goes high in order to drive LED 530. The preferred values for the various components illustrated are as follows:

Resistor 508 — 6.2 K ohms
Capacitor 510 — 0.1 mF
Capacitor 512 — 2.2 mF
Capacitor 514 — 1 mF
Resistor 516 — 4.7 K ohms
Capacitor 518 — 250 mF
Resistor 526 — 20 K ohms
Capacitor 536 — 1 mF Although the present invention has been described with a certain degree of particularity, it is understood that the present disclosure has been made by way of example and that changes in details of structure may be made without departing from the spirit thereof.

We claim:

1. In a telephone system having a calling phone, a called phone, an operator position, means responsive to collect call origination signals generated by said calling phone for interconnecting a communication path between said calling phone and said operator position, and means cooperative with said interconnecting means and said operator position for connecting said called phone to said communication path, an improvement to said system comprising means responsive to an answer signal from said called phone for extending a unique signal over said communication path to said operator position when said called phone is unauthorized to receive a collect call.

2. The improved telephone system of claim 1 further comprising means responsive to said connection of said called phone to said communication path for deactivating said extending means after a predetermined time interval has elapsed.

3. The improved telephone system of claim 1 further comprising means in said operator position receiving said unique signal for turning on an alerting device.

4. In a telephone system having a calling phone, a called phone, an operator position, means responsive to collect call origination signals generated by said calling phone for interconnecting a communication path between said calling phone and said operator position, and means cooperative with said interconnecting means and said operator position for connecting said called phone to said communication path, an improvement to said system comprising:

means responsive to an "OFF HOOK" condition of said called phone for extending a unique signal over said communication path to said operator position when said called phone is unauthorized to receive a collect call, means responsive to said connection of said called phone to said communication path for deactivating said extending means after a predetermined time interval has elapsed, an alerting device, and means in said operator position receiving said unique signal for turning on said alerting device.

5. In a telephone system having a calling phone, a pay telephone, an operator position, means responsive to collect call origination signals generated by said calling phone for interconnecting a communication path between said calling phone and said operator position, and means cooperative with said interconnecting means and said operator position for connecting said pay telephone to said communication path, an improvement to said system comprising means responsive to an "OFF HOOK" condition from said pay telephone for extending a unique signal over said communication path to said operator position.

6. The improved telephone system of claim 5 further comprising means responsive to said connection of said pay telephone to said communication path for deactivating said extending means after a predetermined time interval has elapsed.

7. In a telephone system having a calling phone, a pay telephone having a telephone number other than the 9000 series connector number group, an operator position, means responsive to collect call origination signals generated by said calling phone for interconnecting a communication path between said calling phone and said operator position, and means cooperative with said interconnecting means and said operator position for connecting said pay telephone to said communication path, an improvement to said system comprising:

means responsive to an "OFF HOOK" condition from said pay telephone for extending a unique signal over said communication path to said operator position, means responsive to said connection of said pay telephone to said communication path for deactivating said extending means after a predetermined time interval has elapsed, an alerting device, and means in said operator position receiving said signal for turning on said alerting device.

8. A method for warning an operator in a telephone system when a collect call is being made from a calling party at a calling phone to a called party at a called phone not authorized to receive collect calls, said system including an operator position, means responsive to collect call origination signals generated by said calling phone for interconnecting a communication path between said calling phone and said operator position, and means cooperative with said interconnecting means and said operator position for connecting said called phone to said communication path, said method comprising the steps of:

extending a uniquely coded signal over said communication path to said operator position when an "OFF HOOK" condition appears from said called phone, and warning the operator that the called phone is unauthorized to receive collect calls in response to the extension of the uniquely coded signal.

9. The method of claim 8 further comprising the step of inhibiting the extension of said uniquely coded signal after a predetermined time has elapsed.

10. In a telephone system having a calling phone, a called phone, an operator position, means responsive to collect call origination signals generated by said calling phone for interconnecting a communication path between said calling phone and said operator position, and means cooperative with said interconnecting means and said operator position for connecting said called phone to said communication path, a first detector responsive to ringing potential delivered to said called phone by said connecting means for generating a ring detection signal, a second detector responsive to an "OFF HOOK" potential from said called phone for generating an "OFF HOOK" detection signal, means operative upon the receipt of said ring detection signal and said "OFF HOOK" detection signal for extending a uniquely coded signal over said communication path, and a decoder cooperative with said operator position operative upon receipt of said uniquely coded signal for indicating that said called phone is unauthorized to receive collect calls.

11. The device of claim 10 further comprising means cooperative with said extending means for enabling said extending means for only a predetermined time interval.

12. In a telephone system having a calling phone connected over a calling line with a local office, said local office including a local office control and an operator position; a telephone network; a distant office, said distant office including a distant office control; a called pay telephone connected to said distant office over a called line; said local office control, said operator position, said telephone network, and said distant office control cooperating together to establish a common communication path connecting said calling phone to said called pay phone and to said operator position in response to collect call origination signals from said calling phone; said distant office control being capable of delivering ringing potential over said called line to said called pay phone in response to said communication path establishment; an improvement to said system comprising:

means connected to said called line responsive to the presence of both said ringing potential and an "OFF HOOK" signal from said called pay phone for applying a uniquely coded signal onto said communication path, and means located at said operator position receptive of said uniquely coded signal for generating a warning signal that said called pay phone is unauthorized to receive collect calls.

13. The telephone system of claim 12 wherein said applying means is located at said distant office.

14. The telephone system of claim 12 wherein said applying means comprises:

a first detector responsive to said ringing potential for generating a ring detection signal, a second detector responsive to said "OFF HOOK" potential for generating an "OFF HOOK" detection signal, and means operative upon the receipt of said ring detection signal and said "OFF HOOK" detection signal for extending said uniquely coded signal over said communication path.

15. The telephone system of claim 12 in which said generating means comprises:

an indicator device, and means responsive to said uniquely coded signal for activating said indicator device.

16. The telphone system of claim 14 further comprising means cooperative with said extending means for controlling the time duration of said uniquely coded signal.

* * * * *